United States Patent Office 3,369,384
Patented Feb. 20, 1968

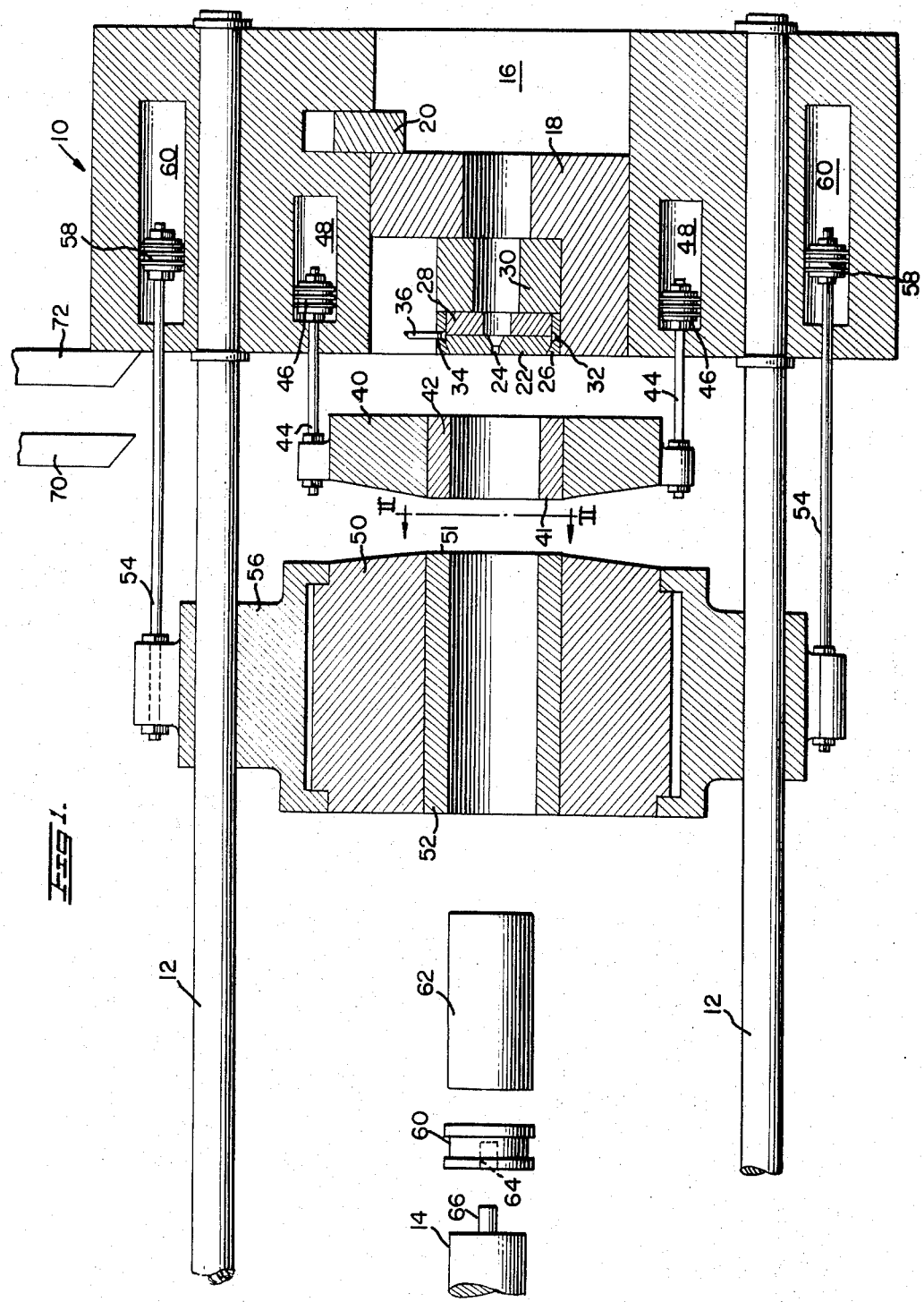

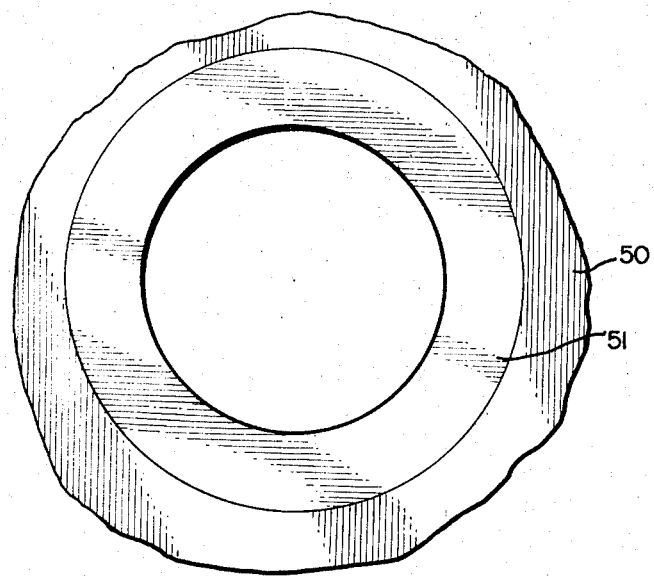
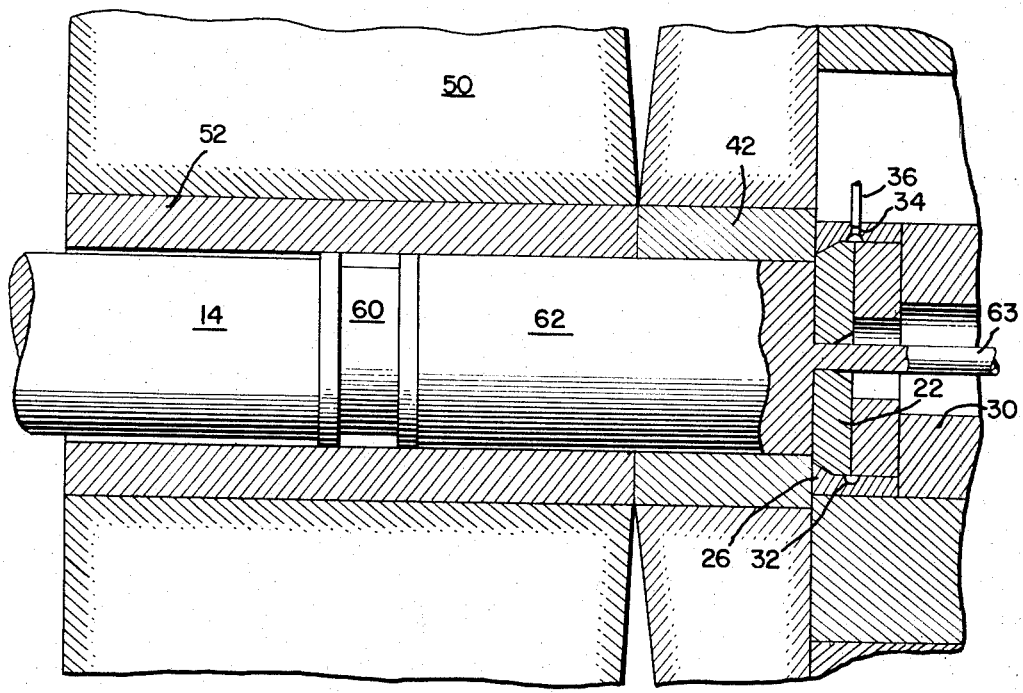

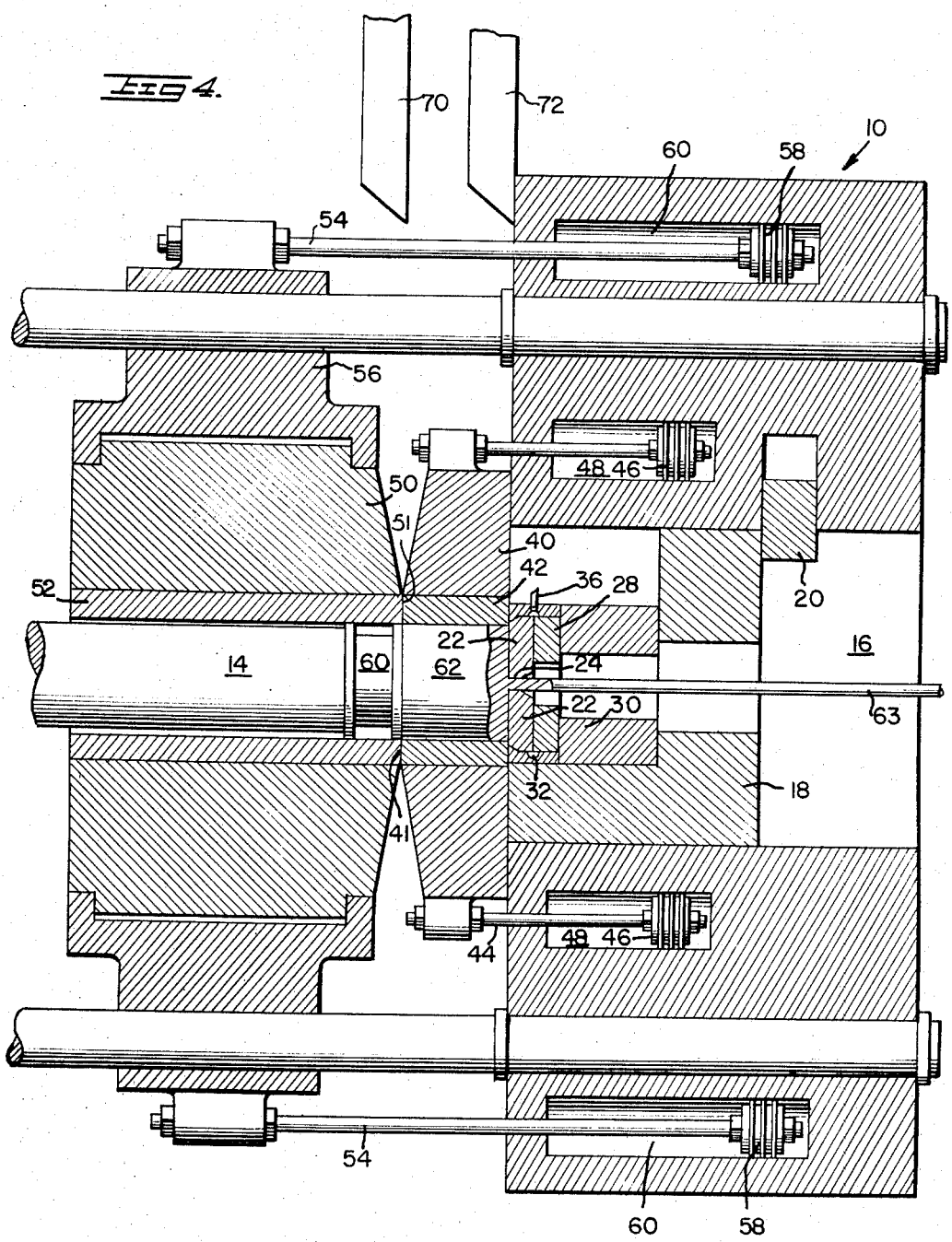

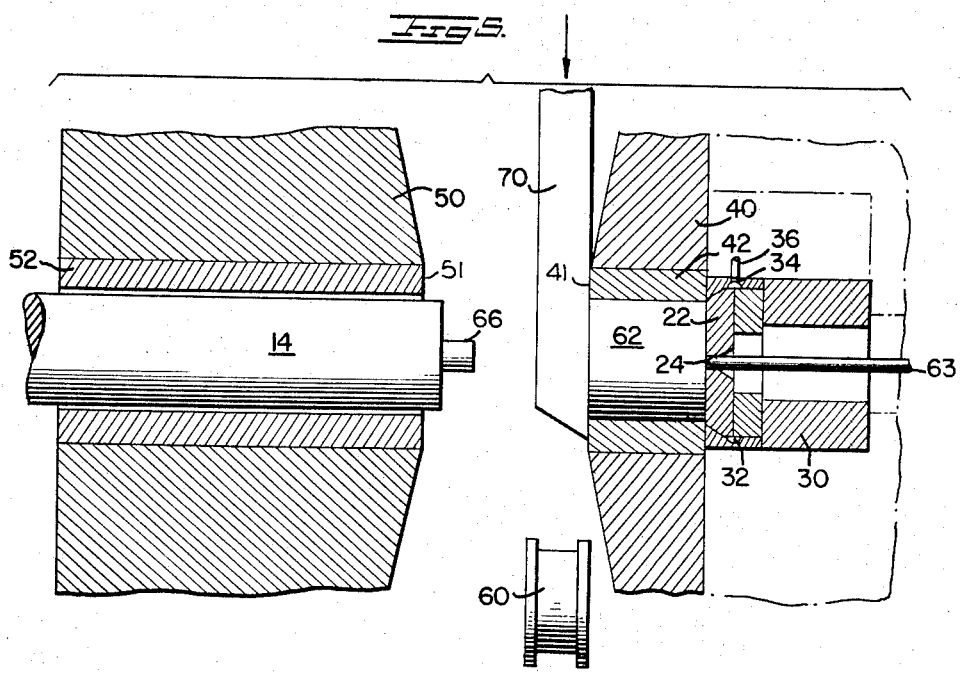
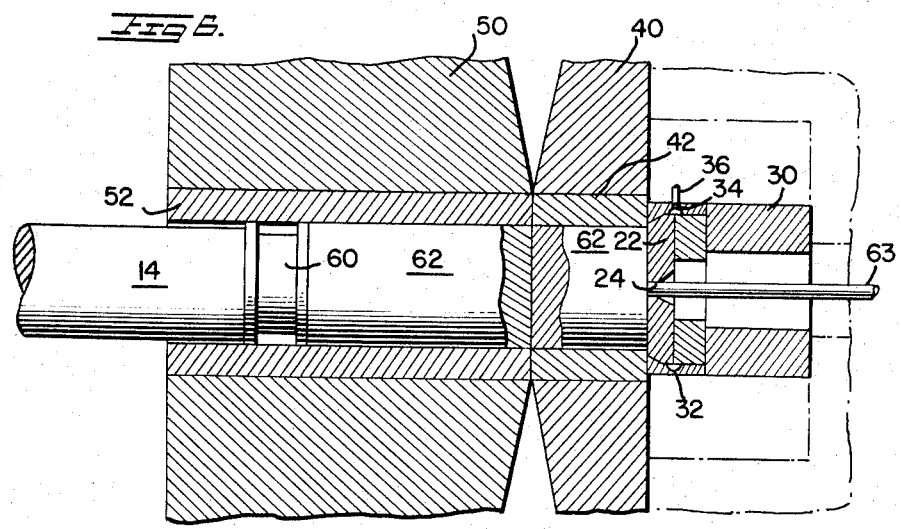

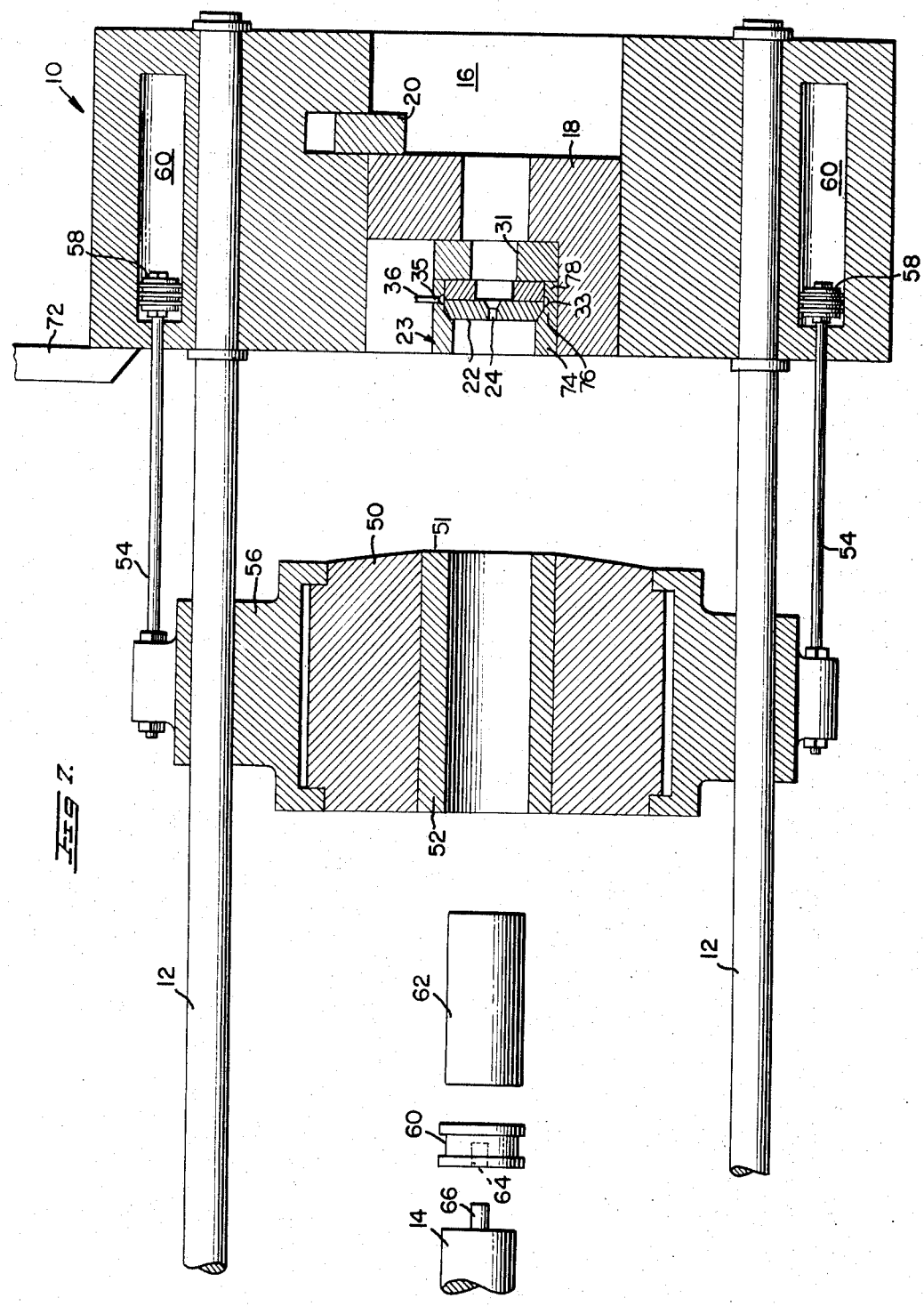

3,369,384
METAL EXTRUSION
Charles J. Beneke, Richmond, and David S. McLellan, Chesterfield County, Va., assignors to Reynolds Metals Company, Richmond, Va., a corporation of Delaware
Filed July 7, 1965, Ser. No. 470,120
12 Claims. (Cl. 72—272)

ABSTRACT OF THE DISCLOSURE

Continuous, "buttless" metal extrusion is performed by an extrusion press having sealed to the rear of a die means a secondary container substantially shorter than the billets to be extruded. With a primary container abutted coaxially against the rear of the secondary container to form a seal which is metal-tight but no air-tight, the billet is extruded until its rear surface is adjacent the rear end of the secondary container. Then extruding is ceased. After another billet is loaded into the primary container and extruding resumed, the metal of the two billets is pressure welded and amalgamated within the secondary container and extruded to form a continuous extrusion, with air which would otherwise to entrapped being expelled through the seal between the primary and secondary containers.

---

This invention relates to a system for producing elongated metal members by extrusion and, more particularly, by continuous or "buttless" extrusion.

In the metal extruding art, discrete metal billets are customarily extruded into discrete metal members, with the maximum possible length of each extruded member being limited by the amount of metal present in a single billet. After one billet is extruded into one metal member, another billet is extruded into a different metal member, and so on. There are several disadvantages to this customary practice.

First, the entire billet cannot be extruded: During an extrusion the oxidized skin and liquated surface portion of the billet tend to become concentrated in the unextruded portion of the billet. In addition, as the unextruded portion of the billet becomes smaller, the metal therein becomes subject to intense and complex deformation and heating which often is deleterious to the properties of the resulting extrusion. If too much of a billet is extruded, the net result of these and other factors is an extrusion having at its rearward end an "extrusion defect," or at best, substantially impaired physical and metallurgical properties. (As used herein, the term "forward" will be used to designate the direction of extruding, while the term "rearward" will be used to designate the opposite direction.) Consequently, the rear of a billet is customarily discarded as a "butt," and becomes scrap. Sometimes this waste constitutes as much as 25 percent by weight of the metal actually extruded; more typically the figure is in the neighborhood of about 5 to 10 percent.

Second, the limitation on the length of each extruded member is undsirable: When the length of the extrusion is not required to be as great as that obtainable from a particular billet volume and die orifice area, the surplus metal of the billet or extrusion is often wasted. On the other hand, when the length of the extrusion is required to be greater than that obtainable from a particular billet volume and die orifice area, separate extrusions must be subsequently joined, or, if possible, a larger extrusion press used. Further, truly "continuous" extrusions are frequently desired, as for example where extruded redraw rod is to be wound into long-length continuous coils.

The metal extruding art, being aware of these and other disadvantages of extruding discrete billets into discrete metal members, has long sought practical systems for achieving continuous or "buttless" extrusion of discrete billets, and, more particularly, systems wherein discrete billets are placed in end-to-end contact and successively extruded through a die so that the metal from the contiguous billets is thoroughly welded to form a continuous extrusion. Such efforts have met with varying degrees of success.

One obstacle was the entrapment within the container of air originating from the clearance between the billet and the container inner wall or between the abutting ends of successive billets. Such entrapped air causes "blowholes" in the resulting extrusions which usually renders them unacceptable. (In a customary extrusion of a discrete billet to form a discrete extrusion, the billet upon being crushed upsets first near its midpoint to close against the container inner wall. As crushing and thus upsetting of the billet progresses, the air behind the midpoint flows back over the dummy block and ram stem and out of the rear end of the container; the air forward of the billet midpoint flows forwardly through the interface between the container and the die.)

Another obstacle was the problem or removal of the dummy block, which often is interposed between the ram stem and the billet. (The purpose of the dummy block is to avoid excessive wear of the ram stem and to allow the ram stem to have a smaller diameter, thereby reducing friction with the container while still preventing back extruding.) Of course, a "dummy block" can be fixed to the ram stem, and retracted with the ram at the end of each extrusion cycle. Such an arrangement is not always acceptable, however, because such fixed dummy blocks tend to reach an excessive temperature or become worn, necessitating frequent replacement, press stoppage to remove from the ram stem and dummy block the metal scraped from the inside of the container during retraction, and more precise alignment between the ram and the container.

In one system for achieving continuous extrusion known as "taper heating" (or "taper cooling"), the billet is heated or cooled so as to have a temperature gradient, the higher temperature being at its front end. This procedure is designed to cause the billet to close against the container wall first at its front end (rather than at its midpoint) so that as such expansion progresses all the air within the container will be expelled over the ram stem and out of the rear end of the container. Although this system can be used to produce an adequate product, it is not entirely satisfactory because, among other reasons, it requires relatively expensive and time-consuming pretreatment, with certain alloys such pre-treatment may interfere with proper heat treatment, and, if a separate dummy block is desired to be used, no provision is made for removing it.

Another system for achieving continuous extrusion involves sealing the container after the billet has been inserted thereinto, and evacuating the air therefrom. Although this system is presently being used for a number of applications, it is not entirely satisfactory because the air evacuation passages leading into the container tend to become clogged, it may be difficult to achieve a tight seal, the apparatus required is relatively complicated and costly, the evacuating operation is relatively time-consuming and expensive, and it makes no provision for removing a dummy block.

Other systems for accomplishing continuous extrusion involve extruding only the forward portion of the billet, then separating the container from the die and shearing or sawing the unextruded butt (and the dummy block, if one is used) from the die. Such systems fail to provide for expelling the air from the container, which problem is even aggravated by the fact that the shearing or sawing operation itself often produces air pockets. In addition, such operations are troublesome and waste the metal of the sheared butt.

Other systems for accomplishing continuous extrusion involves providing billets with convex ends, or a dummy block with a concave pressure surface. As well as being time-consuming and expensive, such systems fail to expel the preponderance of the entrapped air, which is disposed between the billet and the container inner wall.

Still another system for accomplishing continuous extrusion requires machining the billets beforehand so they will closely fit with the container inner wall, thereby preventing any air entrapment. This operation is time-consuming and expensive, and as a practical matter cannot achieve the necessary close fit without creating a tendency for the billets to stick in the container during loading.

The present invention provides for the convenient and economic production of good quality continuous or "buttless" extrusions. The invention includes providing an extrusion press with a secondary container which is substantially shorter than the billets to be used and which has one end that can be sealed either permanently or movably against the tooling. A primary container aligned with the secondary container can be urged against the other end of the secondary container, so that the two form a seal which is metal-tight but not air-tight. In performing a continuous extrusion, ram movement is stopped when the rear end of each billet is adjacent the rear end of the secondary container. The primary container may then be separated from the secondary container and a dummy block removed. After resealing of the primary and secondary container, another billet may be loaded into the primary container and extruded, thereby expelling any entrapped air through the interface between the primary and secondary containers and, as a result of pressure welding and amalgamation of the metal from the two billets within the secondary container, forming a continuous extrusion from the metal of the two billets.

For a better understanding of the invention, and of its other details, objects and advantages, reference is now made to the accompanying drawings, which show, for purposes of illustration only, present preferred embodiments of the invention. In the drawings:

FIGURE 1 is a semi-diagrammatic sectional plan view of a forward portion of an extrusion press according to the invention in the fully retracted position;

FIGURE 2 is a section along II—II of FIGURE 1 and showing one particular embodiment of such apparatus;

FIGURE 3 is a semi-diagrammatic sectional plan view of a part of the forward portion of an extrusion press according to the invention in the extruding position;

FIGURE 4 is a semi-diagrammatic sectional plan view of a forward portion of an extrusion press according to the invention with the ram in the forwardmost position for the continuous extrusion operation;

FIGURE 5 is a semi-diagrammatic sectional plan view of a part of the forward portion of an extrusion press according to the invention with the primary container separated from the secondary container and the dummy block being removed;

FIGURE 6 is a semi-diagrammatic sectional plan view of a part of the forward portion of an extrusion press according to the invention with the primary container re-closed with the secondary container and a second billet and dummy block disposed therein;

FIGURE 7 is a view similar to FIGURE 1 but showing an alternate embodiment according to the invention;

Figure 8:
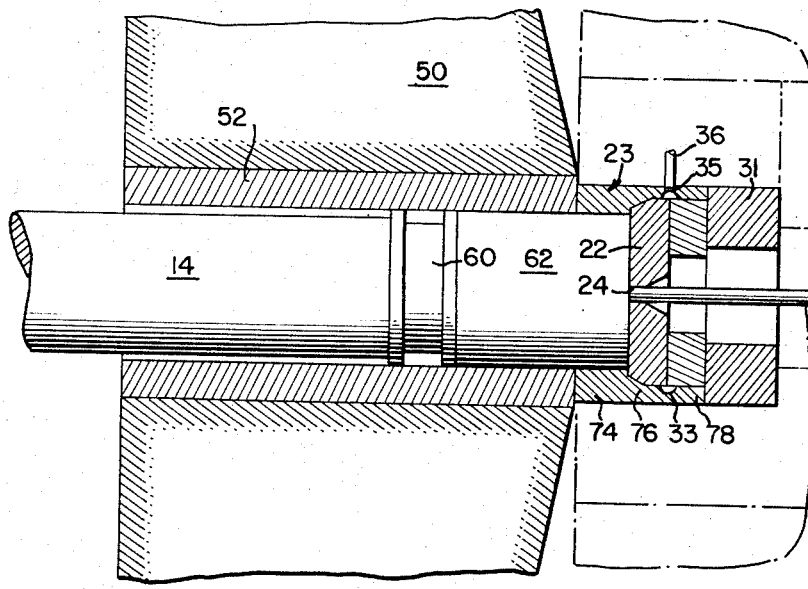
FIGURE 8 is a view similar to FIGURE 3 but showing the alternate embodiment according to the invention shown in FIGURE 6.

Referring now to the drawings, and initially to FIGURE 1, the extrusion press includes stationary front platen 10 connected by columns or tie rods 12 to a stationary rear platen (not shown). A ram having a stem 14 is mounted for movement within a hydraulic cylinder in the rear platen. Front platen 10 has a tool stack passage 16 into which tool carrier 18 can be inserted and locked into position by movable gate lock 20. Supported and ultimately restrained by tool carrier 18 are die 22 with extrusion orifice 24, die holder 26, die backup 28 and die block 30. The inner surface of die holder 26 includes a circumferential groove 32 which surrounds the interface between die 22 and die backup 28 and communicates through passage 34 and coolant line 36 with a suitable coolant source (not shown).

Secondary container 40 having liner 42 is mounted on suitable rails (not shown) for movement with respect to front platen 10. Rods 44 are secured at one end to secondary container 40 and at the other end to double-acting pistons 46 closely fitting within hydraulic cylinders 48 in front platen 10. By controlling the admission of a hydraulic fluid to cylinders 48, secondary container 40 may be restracted from front platen 10, as shown in FIGURE 1, or moved toward it, so that secondary container liner 42 seals against the face of die 22, as shown in FIGURE 4.

Electrically heated primary container 50 having liner 52 is mounted to the rear of secondary container 40 on suitable rails (not shown) for movement with respect to secondary container 40 and front platen 10. Rods 54 are connected at one end to primary container carrier 56 and at the other end to double-acting pistons 58 closely fitting within hydraulic cylinders 60 in front platen 10. By controlling the admission of a hydraulic fluid to cylinders 60, primary container 50 may be retracted from front platen 10 and secondary container 40, as shown in FIGURE 1, or moved toward them, so that front surface 51 of primary container 50 seals against rear surface 41 of secondary container 42, as shown in FIGURE 4.

It is important that the seal formed by surfaces 41 and 51 be metal-tight but not air-tight. Accordingly either or both may be rough-ground or provided with shims or V-grooves extending radially thereacross; for example, flat shims may have a thickness of about .010 inch, or V-grooves may be about 0.15 inch deep, with an apex angle of 90 degrees. In practicing the invention it has been found that the ordinary roughness normally left on container end surfaces is usually sufficient to provide the seal which is metal-tight but not air-tight. Additional polishing of surfaces 41 and 51 is to be avoided, however, since this would increase the likelihood of obtaining an air-tight seal. Surfaces 41 and 51 are deliberately given a reduced radial thickness, for example 1 to 4 inches, to increase the pressure for urging them together, and to decrease the lengths of the air flow "passages" in the seal.

Polished dummy block 60 is slightly smaller than the inner diameters of secondary container 40 and primary container 50, as initially is billet 62. In order to facilitate proper alignment, dummy block 60 may be provided with internal recess 64 for receiving projection 66 on the end of ram 14.

Shear 70 is mounted for passage directly over rear face 41 of secondary container 40 when the latter is closed against die 22, as shown in FIGURE 4. Shear 72 is mounted for passage directly over the face of die 22 when secondary container 40 is retracted from die 22, as shown in FIGURE 1. Alternatively, a single, movable shear can be provided. (Shear 70 and 72 are preferably mounted above the remainder of the extrusion press, but are shown to the side in the drawing for ease of illustration.)

Ram 14, secondary container 40, and primary container 50 are moved and urged forwardly or rearwardly by conventional centrifugal Oilgear pumps which introduce oil through suitable valves and lines into appropriate hydraulic cylinders.

In the alternate embodiment of the invention shown in

FIGURES 7 and 8, a composite, integral "die ring" 23 conveniently has been substituted for secondary container 40 and die holder 26, and a smaller die block 31 is used in order to compensate for the additional length of die ring 23. Die ring 23 has a rearwardly disposed secondary container portion 74, an intermediate die supporting portion 76, and a forwardly disposed die backup portion 78. Much like die holder 26, die ring 23 has internal groove 33 and passage 35, and is connected to line 36. Unlike secondary container 40, however, die ring 23 is not movable with respect to front platen 10. Rear shear 70 is no longer necessary, or alternatively, the single shear may be made stationary.

Figure 9:
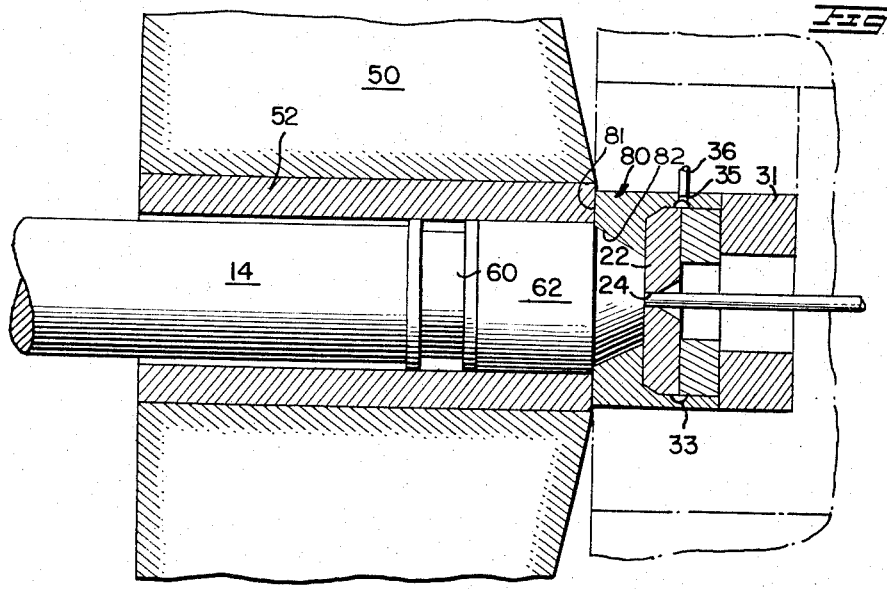
FIGURE 9 is a view similar to FIGURE 8 but showing another alternate embodiment according to the invention.

In the alternate embodiment of the invention shown in FIGURE 9, die ring 80 with tapered cavity 82 has been substituted for die ring 23. Cavity 82 has at its rear end a diameter slightly less than the primary container 50 inner diameter and at its front end a still smaller diameter.

In practicing the method according to the invention, dummy block 60, billet 62, primary container 50, secondary container 40, die 22, and billet and dummy block handling equipment must be cleaned to remove any grease, dirt, oxide, or metal, since this extraneous matter might interfere with the welding of the metal from successive billets. Dummy block 60 is given a wiped coat of light, high-temperature lubricating oil or, alternatively, is dipped into such oil and heated in air gradually up to 670° F. and held at that temperature for one hour; no graphite or grease should be used.

Secondary container 40 and primary container 50 are moved forward, so that the front surface of secondary container 40 forms a seal with die 22, and rear surface 41 of secondary container 40 forms with front surface 51 of primary container 50 a seal which is metal-tight but not air-tight. After pre-heated dummy block 60 and billet 62 are elevated by a suitable mechanism (not shown) into alignment with primary container 50, ram 14 moves forward and pushes billet 62 and dummy block 60 into primary container 50. As ram 14 continues to move forward, the front end of billet 62 passes through secondary container 40 to contact the face of die 22, and billet 62 begins to be crushed. This crushing causes billet 62 to be upset first at its midpoint, where it closes with the inner wall of primary container 50. As this crushing and upsetting of billet 62 progresses in both directions from its midpoint, the air in primary container 50 behind the billet 62 midpoint flows back over dummy block 60 and ram 14 and out the rear end of primary container 50; the air in primary container 50 forward of the billet 62 midpoint flows forwardly through the seal between die 22 and secondary container 40 and through the seal between secondary container 40 and primary container 50. Continuing to move forward, ram 14 and dummy block 60 extrude billet 62 through die orifice 24 to form extrusion 63. See FIGURE 3.

When the rear surface of billet 62 is adjacent the rear surface of secondary container 40, as is shown in FIGURE 4, ram 14 is stopped, primary container 50 retracted, and then ram 14 retracted, so that dummy block 60, being adhered to billet 62, is exposed at the rear of secondary container 40. As is shown in FIGURE 5, shear 70 is then actuated, knocking off dummy block 60. Shear 70 does not "shear" any of billet 62 in the customary sense, so that no voids are created in the metal within secondary container 40. At this point of the operation, therefore, there is no air entrapped within secondary container 40 or die orifice 24.

Now ram 14 is retracted to its rearwardmost position, which is shown in FIGURE 1, and primary container 50 is again moved forwardly, so that its front surface 51 re-closes with rear surface 41 of secondary container 40 to form a seal which is metal-tight but not air-tight. A second dummy block 60 and billet 62 are charged into primary container 50 in the manner described above for the first billet, and ram 14 is again advanced. As ram 14 continues to move forward, the front end of the second billet 62 contacts the rear end of the unextruded portion of the first billet 62, which is still adjacent the rear surface of secondary container 40. Now the second billet 62 begins to be crushed, becoming upset first at its midpoint, where it closes with the inner wall of primary container 50. As this crushing and upsetting of the second billet 62 progresses in both directions from the billet 62 midpoint, the air in primary container 50 between billet 62 and the inner wall of primary container 50 again flows back over dummy block 60 and ram 14 and out the rear end of primary container 50; the air forward of the billet 62 midpoint between billet 62 and the inner wall of primary container 50, together with the air at the interface of the two billets 62, is expelled through the interface of front surface 51 of primary container 50 and rear surface 41 of secondary container 40. Since the seal between surfaces 41 and 51 is metal-tight, no metal can flow into the air "passages" and block them. The extrusion press is now positioned as shown in FIGURE 6. With no air entrapped within primary container 50, secondary container 40, or die orifice 24, ram 14, continuing to move forward, and while pressure welding and amalgamation the metal of the two billets 62, extrudes the remainder of first billet 62 through die orifice 24, then extrudes the second billet 62 through die orifice 24 contiguously therewith, thereby forming a continuous extruded metal member 63 with the metal from each billet thoroughly welded together. See FIGURE 3. When billets of 6063 aluminum alloy are extruded in accordance with the described method, the metal from the separate billets is so thoroughly welded that no interface can be observed.

When the rear surface of the second billet 62 is flush with the rear surface of secondary container 40, as is shown in FIGURE 4, ram 14 is again stopped, and primary container 50 and ram 14 again retracted, etc., and the cycle repeated with a third billet. By continued repetition of the cycle, billets can be continuously extruded into a single metal member. This member is required to be severed only when it extends the length of the runout table or, if it is being coiled, when a coil is completed.

The length of secondary container 40 should be at least ½ inch in order to prevent extrusion defects, and to avoid extremely high ram pressures, but desirably should be no more than the inner diameter of secondary container 40. If this length is too great, secondary container 40 must be heated; otherwise there may be too much loss of heat from the unextruded portion of billet 62 always left in secondary container 40 when primary container 50 is separated therefrom, thereby resulting in unnecessarily high ram pressures and possible loss of characteristics achieved by heat treating during the extrusion of certain alloys. Even when secondary container 40 is heated, its excessive length will unnecessarily increase the frictional force between its inner wall and billet 62.

At the completion of the extruding of the last billet for a particular continuous extrusion, die 22 and secondary container 40 may be cleared of the butt by either shearing or stripping.

In shearing the butt, forward movement of ram 14 is continued until the front face of dummy block 60 comes as far as possible into secondary container 40 without striking die 22 or causing an extrusion defect in extrusion 63. Then primary container 50 and secondary container 40 are retracted and shear 72 actuated to shear the butt from the face of die 22. Dummy block 60 of course falls off with the severed butt.

In stripping the butt, forward movement of ram 14 is stopped when the rear surface of billet 62 is at least several inches to the rear of front surface 51 of primary container 50. Extrusion 63 is then cut or sheared forwardly of die orifice 24 by means not shown. Next ram 14, and then primary container 50, are retracted. The friction between the inner wall of primary container 50 and the several inches of billet 62 located within it causes the butt to be pulled rearwardly from die orifice 24 and secondary container 40. When the butt is pulled free of secondary container 40, primary container 50 is stopped, and ram 14 is advanced, pushing dummy block 60 and the butt out of the forward end of primary container 50. (Alternatively, extrusion 63 may not be severed until after the butt, together with extrusion 63, is pulled free of secondary container 40; shear 70 may then be actuated to sever the rearwardmost portion of extrusion 63 from the butt.)

During the continuous extrusion operation, a hot mass of the metal of unextruded billets 62 will always be abutting the front of die 22, so that the temperature of die 22 may become excessive. In order to prevent this, a suitable coolant (for example, air) is introduced through line 36 and passage 34 into circumferential groove 32 in the inner surface of die holder 26. This coolant proceeds radially inwardly through the interface between die 22 and die backup 28 into the cavity immediately forward of die orifice 24, and exits front platen 10 through tool stack passage 16, thereby withdrawing heat from die 22.

The alternate embodiment of the invention shown in FIGURES 7 and 8 is operated to achieve continuous or "buttless" extrusion in substantially the same manner as the embodiment of the invention described above, with secondary container portion 74 of die ring 23 corresponding to secondary container 40. FIGURE 7 shows the extrusion press in the fully retracted position, while FIGURE 8 shows it during an extrusion. Of course, the butt cannot be sheared from die 22, but must be stripped in the manner described above.

In the alternate embodiment of the invention shown in FIGURE 9, tapered cavity 82 in die ring 80 provides a gradual lead-in for the metal flowing to the die. The rear end of cavity 82 having a diameter slightly less than the inner diameter of container 50 insures that extruding will cease when the forward face of dummy block 60 is immediately adjacent the interface between front surface 51 of primary container 50 and the rear surface 81 of die ring 80, since, dummy block 60 will strike rear surface 84. With this arrangement, however, a portion of billet 62 is urged against rear surface 81 of die ring 80 during extruding. This increases the tendency of the metal to "flash," or flow into the interface between front surface 51 of primary container 50 and rear surface 81 of die ring 80. Repeated flashing during successive extrusions results in a buildup of metal at the interface, preventing a good metal-tight seal between the two surfaces, which in turn encourages more flashing. One way to prevent such flashing would be to provide greater hydraulic forces for urging primary container 50 against die ring 80, but obviously this may be impossible on existing extrusion presses, or would result in the over-design of new extrusion presses.

Of course, if for any reason flashing does occur, the buildup of metal can be removed when primary container 50 is retracted; however, this operation is to be avoided, if possible, since it wastes time.

The invention may, of course, be practiced with either an independent dummy block or a dummy block fixed to the ram.

Although the invention has been described with regard to a horizontal extrusion press, it obviously will be equally applicable to a vertical extrusion press. In addition, the invention is as applicable to extruding tubular metal members, as for example by a bridge or porthole die, is it is to extruding solid metal members.

The invention is further illustrated in the following examples, which were carried out in accordance with the alternate embodiments of the invention described above and shown in FIGURES 7, 8 and 9:

*Example 1*

Unscalped aluminum billets of electrical conductor quality having a diameter of 6 inches and a length of 10 inches were preheated to a temperature of 850° F. to 900° F. A 1,250 ton extrusion press employed a dummy block fixed to the front end of the ram and a secondary container having a frusto-conical cavity which at its rear end had a diameter slightly smaller than the diameter of the cavity in the primary container and at its front end a still smaller diameter. Nine of such billets were successively placed into the 800° F. primary container of the extrusion press and continuously extruded through a single-port die into ¾ inch diameter redraw rod, which emerged at a speed of 120 to 125 feet per minute.

*Example 2*

This example was similar to Example 1, except that five 6063 aluminum alloy billets were continuously extruded into ⅜ inch diameter redraw rod, which was press-quenched and subsequently drawn into wire and formed into chain-link fencing.

*Example 3*

Unscalped 6063 aluminum alloy billets having a diameter of 9 inches and a length of 24 inches were pre-heated to a temperature of 850° F. to 950° F. A 2,300 ton extrusion press employed a dummy block independent of the ram and a secondary container having a cylindrical cavity of the same diameter as the cavity in the primary container. One hundred twenty of such billets were successively placed into the 800° F. primary container of the extrusion press and continuously extruded at a ram speed of 20 inches per minute through a four-hole die into ninety degree angles of 1¼″ x 1¼″ x .187″ dimensions. The extrusion ratio was 39:1. The extrusion was cut into lengths of 125 feet, the length of the run-out table.

*Example 4*

This example was similar to Example 3, except that the billets had a length of 21 inches and sixty-seven billets were continuously extruded through a two-hole die into 90 degree ladder siderail channel of 2.500″ x .817 x .065″ dimensions. The extrusion ratio was 78:1.

*Example 5*

This example was similar to Example 3, except that the billets had a length of 23 inches and fifty-eight billets were continuously extruded at a ram speed of 5 to 12 inches per minute through a three-hole die into ladder step channel-type section of 2.940″ x .820″ x .057″ dimensions. The extrusion ratio was 70:1.

As used herein, the term "cylindrical" will mean having a closed surface traced by a straight line generatrix moving parallel to a fixed straight line.

While present preferred embodiments of the invention have been illustrated and described, it will be understood that the invention may be otherwise variously embodied and practiced within the scope of the following claims. It will be understood that the order in which some of the steps of such claims are recited is not to be construed as necessarily establishing the order in which the steps must be performed; for example, the step of closing a primary container with a secondary container obviously could be performed either before or after the step of disposing a billet in the primary container.

What is claimed is:

1. A method of extruding continuous metal members comprising: compressing a metal billet into a secondary container substantially shorter than said billet and having one end abutting a die means, with its other end adjacent a primary container thereby extruding one end of said billet to form a metal member; and, when the other end of said billet is adjacent said other end of said secondary container, ceasing said extruding.

2. The method according to claim 1 comprising further: compressing another billet against said other end of said first-mentioned billet.

3. A method of extruding continuous metal members comprising: compressing a first metal billet into a secondary container substantially shorter than said billet and having one end abutting a die means, with its other end adjacent a primary container thereby extruding one end of said first billet to form a metal member; and, when the other end of said first billet is adjacent said other end of said secondary container, compressing a second billet against said other end of said first billet.

4. A method of extruding continuous metal members comprising: aligning a metal billet with a die means toward one end and a dummy block toward the other end; moving said dummy block against said billet so as to compress said billet into a container substantially shorter than said billet and having one end abutting said die means, with its other end adjacent a primary container thereby extruding said one end of said billet to form a metal member; and, when the interface between said dummy block and said other end of said billet is adjacent said other end of said secondary container, ceasing said moving of said dummy block; and removing said dummy block from contact with said billet.

5. The method according to claim 4 comprising further: compressing another billet against said other end of said first-mentioned billet.

6. A method of extruding a metal member comprising the steps of: closing a primary container with a secondary container aligned therewith and sealed to a die means having an extrusion orifice, so that the front surface of said primary container forms with the rear surface of said secondary container a seal which is metal-tight but not air-tight; disposing a metal billet in said primary container; disposing a dummy block in said primary container at a position to the rear of the position of said billet; advancing a ram forwardly within said container into contact with said dummy block; and comprising the subsequent steps of: advancing said ram forwardly, thereby compressing said dummy block against said billet, eventually compressing said billet against said die means, and extruding said billet through said orifice to produce said metal member; stopping said ram at a position such that the rear surface of said billet and the front surface of said dummy block are adjacent said seal between said primary container and said secondary container; separating said ram and said primary container from said dummy block and said secondary container, respectively, so that said dummy block is exposed at the rear of said secondary container; and removing said dummy block from its position adjacent the rear of said billet, so that the rearwardmost, unextruded portion of said billet remains within said secondary container.

7. The method according to claim 6 comprising the further steps of: retracting said ram rearwardly; re-closing said primary container with said secondary container, thereby re-forming said seal between said primary container and said secondary container; disposing another metal billet in said primary container; disposing a dummy block in said primary container at a position to the rear of the position of said other billet; and advancing said ram forwardly within said container into contact with said dummy block; and comprising the subsequent steps of: advancing said ram forwardly, thereby compressing said dummy block against said other billet, compressing said other billet against said rearwardmost, unextruded portion of the first-mentioned said billet, expelling entrapped air through the seal between said primary container and said secondary container, and extruding said unextruded portion through said orifice; and advancing said ram further forwardly, thereby contiguously extruding said other billet through said orifice so as to produce a continuous metal member containing metal from said first-mentioned billet integrally joined to metal from said other billet.

8. The method according to claim 6 wherein said primary container is retracted rearwardly in order to be separated from said secondary container.

9. The method according to claim 6 wherein, prior to the disposing of said dummy block in said primary container, the forward face of said dummy block is only lightly lubricated.

10. A method of using an extrusion press to extrude continuous metal members, said extrusion press including: a front platen; die means supported by and restrained by said front platen; a secondary billet container aligned with and adapted to form a seal with said die means, and having a rear sealing surface; a primary billet container aligned with said secondary container, movable with respect to said secondary container, and having a front sealing surface; means for urging said primary billet container tightly against said secondary billet container; said front sealing surface of said primary container being adapted to form with said rear sealing surface of said secondary container when so urged tightly thereagainst a seal which is metal-tight but not air-tight; said method comprising the steps of: urging said primary container tightly against said secondary container; with a metal billet disposed in said primary container rearwardly of said billet, advancing a ram forwardly within said container against a dummy block, thereby forcing said billet forwardly and extruding it through an orifice in said die means to form a first metal member; stopping said ram at a position such that the rear surface of said billet is adjacent said seal between said containers; separating said primary container from said secondary container, thereby exposing said dummy block at the rear of said secondary container; and removing said dummy block from its position adjacent the rear of said billet, so that the rearwardmost, unextruded portion of said billet remains within said secondary container.

11. The method according to claim 10 comprising the further steps of: re-closing said primary container with said secondary container, thereby re-forming said seal between said primary container and said secondary container; and forcing another billet forwardly against the rear surface of said first-mentioned billet, thereby contiguously extruding said other billet through said orifice so as to produce a continuous metal member containing metal from said first-mentioned billet integrally joined to metal from said other billet.

12. The method according to claim 6 wherein said dummy block is separate from said ram and is removed by being passed radially outwardly between said front surface of said primary container and said rear surface of said secondary container.

References Cited

UNITED STATES PATENTS

| | | | |
|---|---|---|---|
| 2,539,564 | 1/1951 | Barrett | 72—273 |
| 2,720,970 | 10/1955 | Roux | 72—263 |
| 2,755,926 | 7/1956 | Horn | 76—259 |
| 3,279,230 | 10/1966 | Johnson | 72—263 |

RICHARD J. HERBST, *Primary Examiner.*

K. C. DECKER, *Assistant Examiner.*

UNITED STATES PATENT OFFICE
CERTIFICATE OF CORRECTION

Patent No. 3,369,384                 February 20, 1968

Charles J. Beneke et al.

It is certified that error appears in the above identified patent and that said Letters Patent are hereby corrected as shown below:

Column 8, line 68, after "means" strike out the comma; line 69, after "container" insert a comma; column 9, line 4, after "means" strike out the comma; line 5, after "container" insert a comma.

Signed and sealed this 15th day of July 1969.

(SEAL)
Attest:

Edward M. Fletcher, Jr.                 WILLIAM E. SCHUYLER, JR.
Attesting Officer                           Commissioner of Patents